US011540351B2

United States Patent
Chen et al.

(10) Patent No.: US 11,540,351 B2
(45) Date of Patent: Dec. 27, 2022

(54) SYSTEMS AND METHODS FOR BROADBAND FAILOVER IN LAND MOBILE RADIO NETWORKS

(71) Applicant: MOTOROLA SOLUTIONS, INC., Chicago, IL (US)

(72) Inventors: DaJun Chen, Weston, FL (US); Andor Almasi, Cooper City, FL (US); David R. Mills, West Palm Beach, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 225 days.

(21) Appl. No.: 16/796,727

(22) Filed: Feb. 20, 2020

(65) Prior Publication Data

US 2021/0267013 A1 Aug. 26, 2021

(51) Int. Cl.
*H04W 88/06* (2009.01)
*H04W 8/26* (2009.01)
(Continued)

(52) U.S. Cl.
CPC .......... *H04W 88/06* (2013.01); *H04B 17/318* (2015.01); *H04W 8/26* (2013.01); *H04W 36/0022* (2013.01); *H04W 36/0079* (2018.08); *H04W 36/14* (2013.01); *H04W 36/30* (2013.01); *H04W 48/18* (2013.01); *H04W 84/042* (2013.01); *H04W 92/02* (2013.01)

(58) Field of Classification Search
CPC ..... H04W 88/06; H04W 8/26; H04W 84/042; H04W 36/14; H04W 48/18; H04W 36/0022; H04W 36/30; H04W 36/0079; H04B 17/318
See application file for complete search history.

(56) References Cited

U.S. PATENT DOCUMENTS 8,145,262 B2 * 3/2012 Martinez ............... H04W 88/06
370/328
8,537,663 B2 9/2013 Poulson et al.
(Continued)

FOREIGN PATENT DOCUMENTS

CN 1150798 C 5/2004
CN 1918927 A 2/2007

*Primary Examiner* — Muthuswamy G Manoharan
(74) *Attorney, Agent, or Firm* — Michael Best & Friedrich LLP

(57) ABSTRACT

Systems and methods for broadband failover in land mobile radio networks. One method includes operating a first communication interface of a converged communication device to execute a first communication between the device and a first network using an LMR modality. The method includes determining a plurality of radio communication characteristic values for each of a plurality of sites of the first network and generating a fallback threshold for a home site of the device based on the plurality of radio communications characteristics. The method includes determining whether a current radio communication characteristic value associated with a home site of the device exceeds the fallback threshold, and, when the current radio communication characteristic value does not exceed the fallback threshold, operating a second communication interface of the converged communication device to execute a second communication between the device and a second network using a non-LMR modality.

18 Claims, 6 Drawing Sheets

(51) Int. Cl.
*H04W 36/14* (2009.01)
*H04W 48/18* (2009.01)
*H04W 36/30* (2009.01)
*H04W 36/00* (2009.01)
*H04W 92/02* (2009.01)
*H04B 17/318* (2015.01)
*H04W 84/04* (2009.01)

(56) References Cited

U.S. PATENT DOCUMENTS

| | | |
|---|---|---|
| 9,787,530 B2 | 10/2017 | Poulson et al. |
| 9,877,271 B2 | 1/2018 | Su |
| 9,888,423 B2 | 2/2018 | Su et al. |
| 2010/0080205 A1* | 4/2010 | Hirsch .................. H04L 1/0002 370/338 |
| 2010/0178919 A1 | 7/2010 | Deepak et al. |
| 2016/0345234 A1* | 11/2016 | Yang ................. H04W 36/0022 |
| 2017/0367008 A1* | 12/2017 | Takahashi ............. H04W 48/10 |
| 2020/0136796 A1* | 4/2020 | Bockrath ................ H04L 65/80 |

* cited by examiner

500 ↘

| SERVICE FAILURE | LMR SITE ID | CURRENT RSSI |
|---|---|---|
| RETRY COMPLETION | 2(UHF) | 33 |
| QUICK FADING | 1(VHF) | 25 |
| HIGH BER | 3(800) | 35 |
| ........ | 2(UHF) | 32 |
| ........ | 1(VHF) | 30 |

600 ↘

| LMR SITE ID | FALLBACK RSSI THRESHOLD |
|---|---|
| 1 | 30 |
| 2 | 33 |
| 3 | 35 |

SYSTEMS AND METHODS FOR BROADBAND FAILOVER IN LAND MOBILE RADIO NETWORKS

BACKGROUND OF THE INVENTION

Public safety and other organizations use communication networks and portable electronic devices to facilitate communication among their members. Some of these devices operate over multiple communication systems. For example, portable two-way radios, smart telephones, and converged devices issued to public safety officers may simultaneously operate over land mobile radio (LMR) networks, long-term evolution (LTE) networks, or other wireless communication systems that provide broadband capabilities.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
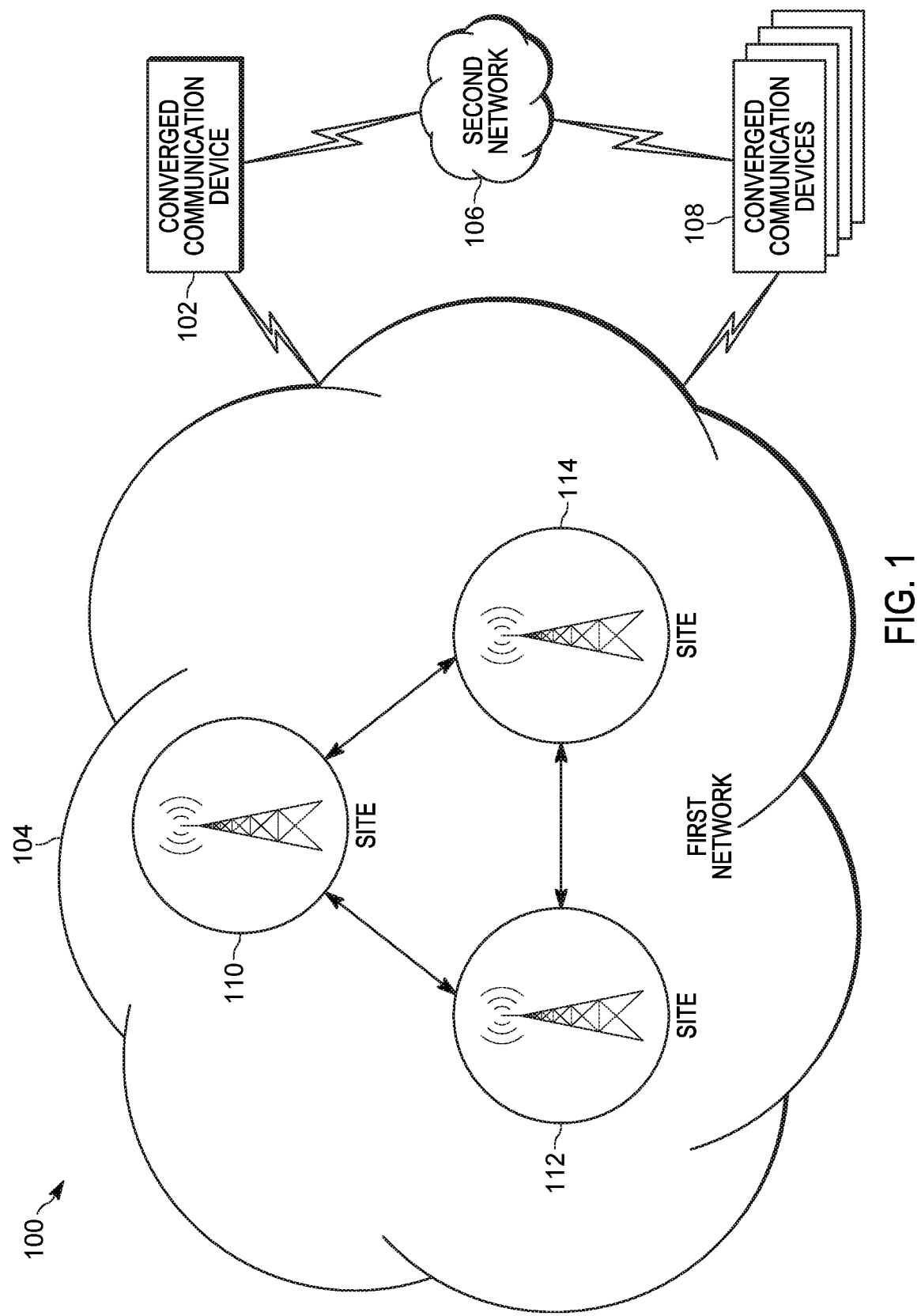
FIG. 1 illustrates a multiple network wireless communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, some converged communication devices are configured to operate over both land mobile radio (LMR) networks and broadband networks. Converged communication devices are capable of sending certain transmissions (for example, push-to-talk and other voice communications) over both LMR and broadband networks. When LMR connectivity is unavailable, such devices provide backup voice communications using the Voice over IP (VoIP) protocol via a broadband network (for example, an LTE network).

Some converged communication devices are configured to switch between networks using static radiofrequency signal strength settings. However, a number of factors beyond signal strength may affect network and service availability (for example, the current operating band, the power settings of the device and the base stations, location, and the like). Different devices operating on a network have different radiofrequency capabilities. In addition, the radiofrequency performance of a single device may differ between network sites and may differ for the same site depending on time and location. Switching from an LMR network to a backup broadband connection based solely on signal strength, while failing to consider other factors, can cause devices to switch from LMR to broadband unnecessarily. In systems with large numbers of devices, such switching can lead to imbalanced traffic flows and inefficient use of network resources as some networks are underutilized and others are over utilized. Accordingly, systems and methods are provided herein for automated broadband failover in LMR networks using dynamic thresholds.

Among other things, some embodiments provided herein generate dynamic broadband failover and return thresholds based on current and historic LMR network conditions. For example, in some embodiments, each converged communication device on the LMR network tracks service success and failure, and other performance data for the network's sites. Each such device use this performance data to generate its own fallback and return thresholds for each LMR site. As these devices operate on the network, additional performance data is collected and used to automatically adjust the thresholds as network conditions change. Thus, the devices do not rely on a single static signal strength trigger, and instead use dynamic thresholds. Using the dynamic thresholds enables devices to failover to a broadband network preemptively (that is, prior to a service failure) and return to the LMR network when conditions improve. Network devices using dynamic thresholds are also more tolerant of individual LMR service failures, enabling such devices to maintain LMR connections for longer periods of time.

Among other things, using such embodiments, network devices reduce unnecessary switching between networks. This reduced switching, in turn, leads to more efficient use of the networks and their respective computing resources.

One example embodiment provides a converged communication device. The portable communication device includes a first communication interface configured to communicate with a first network using a first communication modality. The first communication modality is a land mobile radio modality. The portable communication device also includes a second communication interface configured to communicate with a second network using a second communication modality. The second communication modality is a non-land mobile radio modality. The portable communication device also includes an electronic processor coupled to the memory, the first communication interface, and the second communication interface. The electronic processor is configured to operate the converged communication device using the first communication modality to execute a first communication between the converged communication device and the first network. The electronic processor is configured to determine a plurality of radio communication characteristic values for each of a plurality of sites of the first network. The electronic processor is configured to generate a fallback threshold for a home site of the converged communication device based on the plurality of radio communications characteristics. The electronic processor is configured to determine whether a current radio communication characteristic value associated with a home site of the converged communication device exceeds the fallback threshold. The electronic processor is configured to, when the current radio communication characteristic value does not exceed the fallback threshold, operate the converged communication device using the second communication modality to execute a second communication between the converged communication device and the second network.

Another example embodiment provides a method for operating a converged communication device. The method includes operating a first communication interface of the converged communication device to execute a first communication between the converged communication device and a first network using a land mobile radio modality. The method includes determining, with an electronic processor, a plurality of radio communication characteristic values for each of a plurality of sites of the first network. The method includes generating a fallback threshold for a home site of the converged communication device based on the plurality of radio communications characteristics. The method includes determining whether a current radio communication characteristic value associated with a home site of the converged communication device exceeds the fallback threshold. The method includes, when the current radio communication characteristic value does not exceed the fallback threshold, operating a second communication interface of the converged communication device to execute a second communication between the converged communication device and a second network using a non-land mobile radio modality.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a block diagram of an example multiple network wireless communication system 100. FIG. 1 shows one example of a network configuration, in which embodiments may be implemented; other configurations are possible. In the example shown, the system 100 includes a converged communication device 102, a first network 104, and a second network 106. The converged communication device 102, described more particularly herein with respect to FIG. 2, incorporates components (e.g., hardware and software) to permit communications via two or more communication modalities. For example, the converged communication device 102 may independently communicate with the first network 104 using a first communication modality and the second network 106 using a second communication modality. The converged communication device 102 and a plurality of other converged communication devices 108 are communicatively coupled to one another via the first network 104 and the second network 106 using one or both communication modalities.

In the illustrated embodiment, the first network 104 is a land mobile radio (LMR) network. LMR systems are terrestrially-based, wireless communications systems commonly used by federal, state, local, tribal, and territorial emergency responders, public works companies, and even the military to support voice and low-speed data communications. Such systems typically consist of handheld portable two-way radios, mobile two-way radios, base stations, a network, and repeaters. LMR systems provide two-way radio communications, typically in the VHF, UHF, 700 MHz, and 800 MHz frequency bands, for example, implemented in accordance with the Association of Public Safety Communications Officials (APCO) "Project 25" (P25) two-way radio communications protocol. In some embodiments, the first network 104 may operate according to the TETRA standard defined by the European Telecommunication Standards Institute (ETSI), the Digital Private Mobile Radio (dPMR) standard also defined by the ETSI, the Digital Mobile Radio (DMR) standard also defined by the ETSI, among other possibilities, and over which multimedia broadcast multicast services (MBMS), single site point-to-multipoint (SC-PTM) services, or Mission Critical Push-to-talk (MCPTT) services may be provided.

As illustrated, the first network 104 includes three sites 110, 112, 114. In some embodiments, the sites 110, 112, 114 are LMR base stations. The converged communication device 102 and the plurality of other converged communication devices 108 establish connections with, and communicate via, one of the sites 110, 112, 114. When connected with a converged communication device, the connected site is referred to as the "home site" of the converged communication device. As described herein, a converged communication device is able to gather communication characteristics and performance data for its home site and other nearby sites (adjacent sites).

The second network 106 is a broadband communications network. The second network 106 may operate according to an industry standard cellular protocol such as, for example, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which, among other things, an open mobile alliance (OMA) push to talk (PTT) over cellular (OMA-PoC), a voice over IP (VoIP), or a PTT over IP (PoIP) application may be implemented. In some embodiments, the system 100 includes additional LMR or broadband networks. As would be understood by one skilled in the art, FIG. 1 is a simplified diagram and wireless networks are more complex than the schematic elements depicted in FIG. 1.

Figure 2:
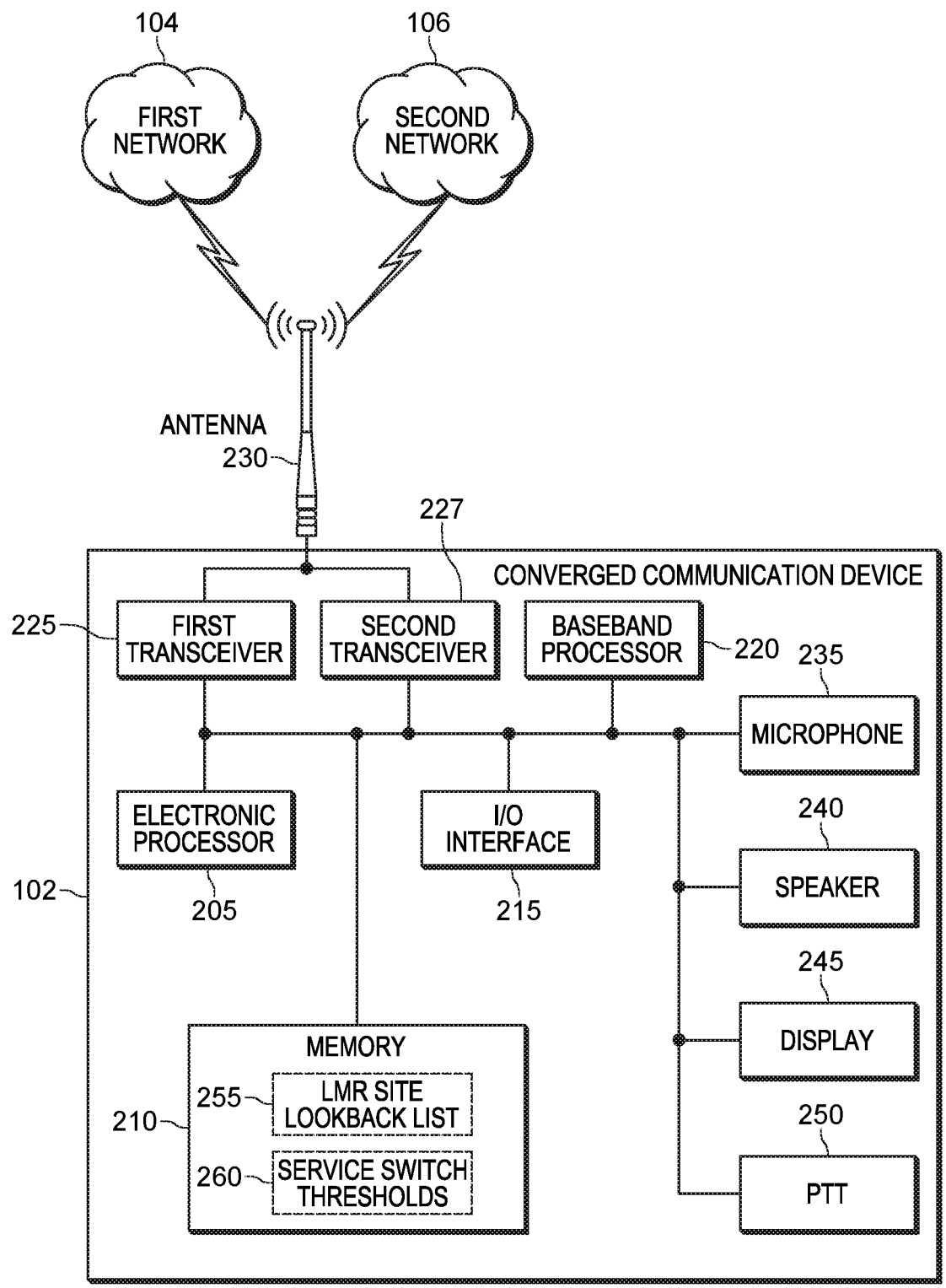
FIG. 2 schematically illustrates a converged communication device in accordance with some embodiments.

FIG. 2 schematically illustrates one embodiment of the converged communication device 102. In the embodiment illustrated, the converged communication device 102 includes an electronic processor 205, a memory 210, an input/output interface 215, a baseband processor 220, a first transceiver 225, a second transceiver 227, an antenna 230, a microphone 235, a loudspeaker 240, and a human machine interface (including a display 245 and a push-to-talk (PTT) selection mechanism 250). The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

In some embodiments, the converged communication device 102 includes fewer or additional components in configurations different from that illustrated in FIG. 2.

The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein. The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, an LMR site lookback list 255 and dynamic service switch thresholds 260 (both described in detail herein).

The input/output interface 215 is configured to receive input and to provide system output. The input/output interface 215 obtains information and signals from, and provides information and signals to, (for example, over one or more wired and/or wireless connections) devices both internal and external to the converged communication device 102.

The electronic processor 205 is configured to control the baseband processor 220, the first transceiver 225, and the second transceiver 227 to transmit and receive radio frequency signals (for example, encoded with audio or other data) to and from the converged communication device 102. The baseband processor 220 encodes and decodes digital data (including digitized audio signals) sent and received by the first transceiver 225 and the second transceiver 227. In one example embodiment, the first transceiver 225 is configured to transmit and receive LMR radio signals to and from, for example, the sites 110, 112, 114 of the first network 104 using the antenna 230, and the second transceiver 227 transmits and receives broadband communications to and from, for example, the second network 106 using the antenna 230.

The electronic processor 205, the baseband processor 220, the first transceiver 225, and the second transceiver 227 may include various digital and analog components (for example, digital signal processors, high band filters, low band filters, and the like), which for brevity are not described herein and which may be implemented in hardware, software, or a combination of both. In some embodiments, either one or both of the first transceiver 225 and the second transceiver 227 are combined transmitter-receiver components. In other embodiments, either one or both of the first transceiver 225 and the second transceiver 227 include separate transmitter and receiver components.

The microphone 235 is a transducer capable of sensing sound, converting the sound to electrical signals, and transmitting the electrical signals to the electronic processor 205. The electronic processor 205 processes the electrical signals received from the microphone 235 to produce an audio signal, which may be transmitted to other devices via the transceiver 225. The loudspeaker 240 is a transducer for reproducing sound from electrical signals (for example, generated from a received audio signal) received from the electronic processor 205. In some embodiments, the microphone 235, the loudspeaker 240, or both may be integrated in a single housing with the other components (for example, in a portable hand-held radio, smart telephone, or converged device). In some embodiments, the microphone 235, the loudspeaker 240, or both are present in an accessory device (for example, a remote speaker microphone (RSM) or headset) connect via a wired or wireless connection to the converged communication device 102.

The display 245 is a suitable display, for example, a liquid crystal display (LCD) touch screen, or an organic light-emitting diode (OLED) touch screen. In some embodiments, the converged communication device 102 implements a graphical user interface (GUI) (for example, generated by the electronic processor 205, from instructions and data stored in the memory 210, and presented on the display 245), that enables a user to interact with the converged communication device 102.

The push-to-talk selection mechanism 250 allows a user of the converged communication device 102 to initiate push-to-talk (including PTX) communications to one or more other communication devices. In some embodiments, the push-to-talk selection mechanism 250 is a mechanical button, key, switch, or knob. In some embodiments, the push-to-talk selection mechanism 250 is provided as part of a graphical user interface (for example, a virtual button) presented on the display 245.

The converged communication device 102 may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. The converged communication device 102 may also implement a Long Term Evolution (LTE) (including LTE-Advanced or LTE-Advanced Pro compliant with, for example, the 3GPP TS 36 specification series) or 5G (including a new radio (NR) air interface compliant with the 3GPP TS 38 specification series) protocol, among other possibilities, over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), an LTE Direct or LTE Device to Device, or a PTT over IP (PoIP) application may be implemented. Direct mode LTE standards may additionally or alternatively be implemented as well, including but not limited to the LTE Direct device-to-device standard.

Each of the plurality of converged communication devices 108 includes similar components as described above, and is configured similarly to the converged communication device 102.

As noted, some converged devices are capable of switching from an LMR network to an available broadband network in order to transmit voice communications when the LMR network is not available (for example, due to a service failure or insufficient signal). Typically, such converged devices failover to a broadband network based on a static signal strength threshold for the network. For example, when the LMR connection for one of the devices on the network does not meet a required received signal strength intensity (RSSI) level, the device will move to a broadband connection. However, such thresholds are set without consideration for other factors, for example, the location of the device, the location of the LMR sites, the current frequency band, and the service history of the device with the individual LMR sites. Switching from an LMR network to a backup broadband connection based on such static signal strength thresholds can cause devices to switch from LMR to broadband unnecessarily. This unnecessary switching results in, among other things, the inefficient use of the converged communication devices, the LMR network, and the broadband network.

Figure 3:
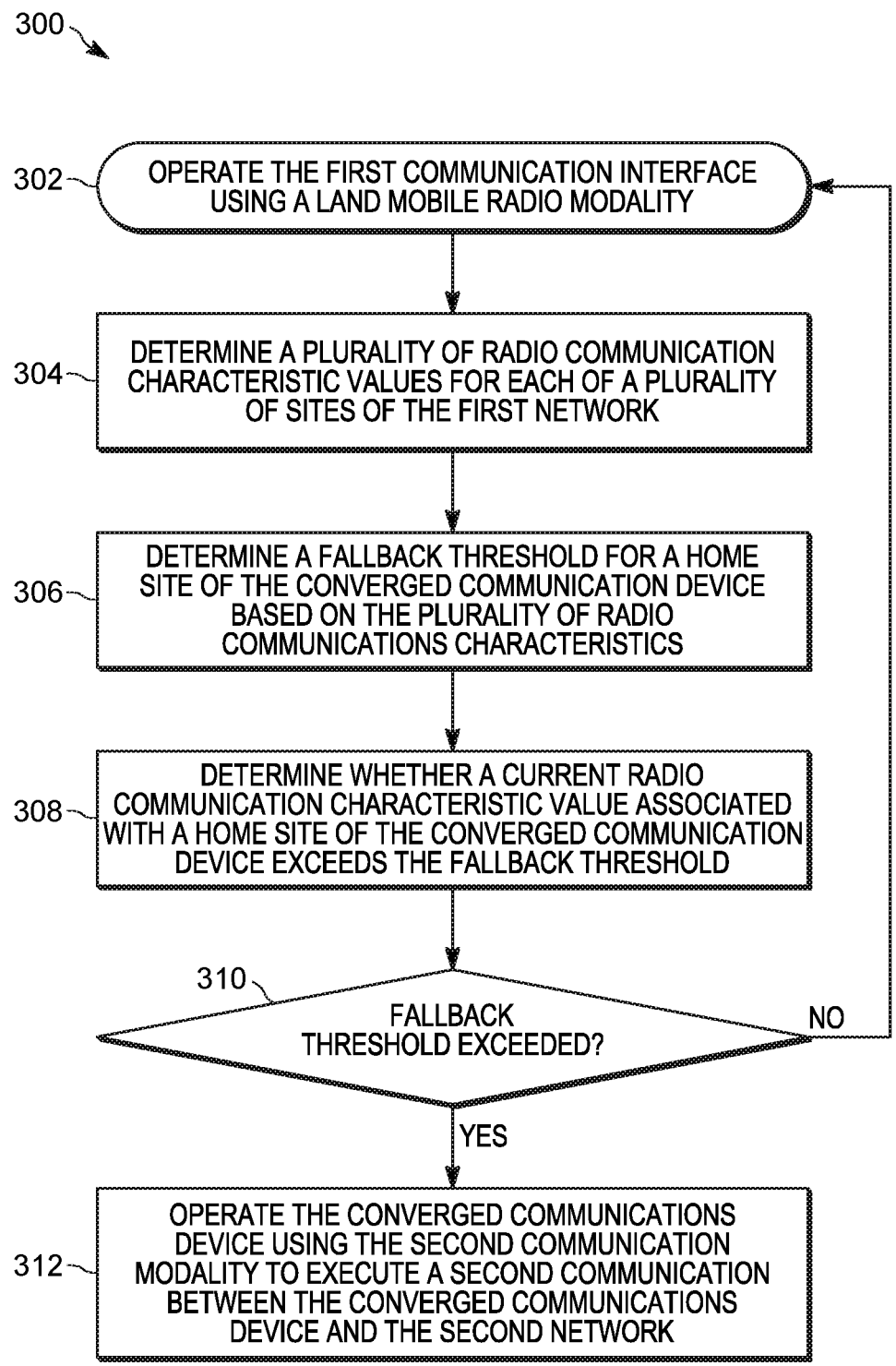
FIG. 3 is a flowchart illustrating a method for operating the converged communication device of FIG. 2 in accordance with some embodiments.

FIG. 3 illustrates an example method 300 for operating a converged communication device using dynamic thresholds. Using dynamic thresholds may, among other things, reduce unnecessary network switching and improve the performance of the device. Although the method 300 is described in conjunction with the system 100 as described herein, the method 300 could be used with other systems and devices. In addition, the method 300 may be modified or performed differently than the specific example provided.

As an example, the method 300 is described as being performed by the converged communication device 102 and, in particular, the electronic processor 205. However, in some embodiments, portions or all of the method 300 may be performed by other devices. Additional electronic processors may also be included in the converged communication device 102 that perform all or a portion of the method 300. For ease of description, the method 300 is described in terms of the converged communication device 102, the first network 104, and the second network 106. However, the method 300 may be applied to hundreds or thousands of devices operating across multiple networks.

At block 302, the method 300 begins with the converged communication device 102 attached to and operating on an LMR network (for example, the first network 104). This is the default operating mode for the converged communication device 102. The electronic processor 205 operates a first communication interface (for example, the first transceiver 225) of the converged communication device 102 to execute a first communication (for example a push-to-talk communication) between the converged communication device 102 and the first network 104 using a first communication modality (for example, a land mobile radio modality).

While operating on the LMR network, the converged communication device 102 operates to collect performance and other data about the LMR service. In particular, the converged communication device 102 gathers data about the LMR site that it is connected to (home site) and sites from which it can receive radiofrequency signals (adjacent sites). At block 304, the electronic processor 205 determines a plurality of radio communication characteristic values for one or more of a plurality of sites 110, 112, 114 of the first network 104. For example, the electronic processor 204 may receive the plurality of radio communication characteristic values from each site via a respective control channel between the converged communication device 102 and each site. In some embodiments, the plurality of radio communication characteristic values may be retrieved from an external database or a memory of the converged communication device 102. The electronic processor 205 may determine some radio communication characteristic values by analyzing signals received from the LMR sites. Radio communication characteristics identify and characterize the site. Examples of radio communication characteristics include a frequency band, a control channel frequency, a site identifier, a system accessibility, a site location, a bit error rate, an indication of a successful transmission, an indication of a failed transmission, a signal fading indication, an acceptable RSSI level for the site, and the like.

In some embodiments, the converged communication device 102 periodically determines updated radio communication characteristic values to develop an LMR site lookback list (See FIG. 5), which may be stored in a memory of the converged communication device 102. As described herein, the electronic processor 205 uses the LMR site lookback list to generate a dynamic fallback threshold. In some embodiments, the electronic processor 205 also updates the LMR site lookback list when an LMR service failure is detected. The electronic processor 205 may detect a service failure for the home site based on at least one of the radio communication characteristic values for the home site (for example, a high bit error rate). When a service failure is detected, the electronic processor 205 writes, to the memory 210, the at least one radio communication characteristic value for the home site at the time of the service failure and an RSSI level for the home site at the time of the service failure. For example, as illustrated in chart 500 of FIG. 5, an LMR site 3 experienced a high bit error rate service failure when the RSSI was 35.

As the LMR site lookback list is populated, it is used to generate network switch criteria (dynamic thresholds) for each site based on LMR service failure RSSI history data. Returning to FIG. 3, at block 306, the electronic processor 205 generates a fallback threshold for a home site of the converged communication device 102 based on the plurality of radio communications characteristics. The fallback threshold is an RSSI value, which determines when the converged communication device 102 will move to a broadband network without having experienced an LMR service failure. In some embodiments, the electronic processor 205 retrieves from the memory 210 the radio communication characteristic values for the home site at the time of the service failures, and generates the fallback threshold based on one or more of (i) the plurality of radio communications characteristics, (ii) the radio communication characteristic values for the home site at the times of the service failures, and (iii) the RSSI levels for the home site at the times of the service failures. In some embodiments, the following formula is used to generate fallback thresholds:

$$FallbackRssiThreshold=Max\{RSSI\_1, RSSI\_2 \ldots RSSI\_n\}; 0<n<10(latest)$$

Using this example, the maximum RSSI value of the last ten values is selected on a rolling basis. This selects the maximum RSSI in the recorded service failure log based on a recent time frame. In some embodiments, RSSI values are selected from service logs based on geographic area.

Figures 5, 6, 7:
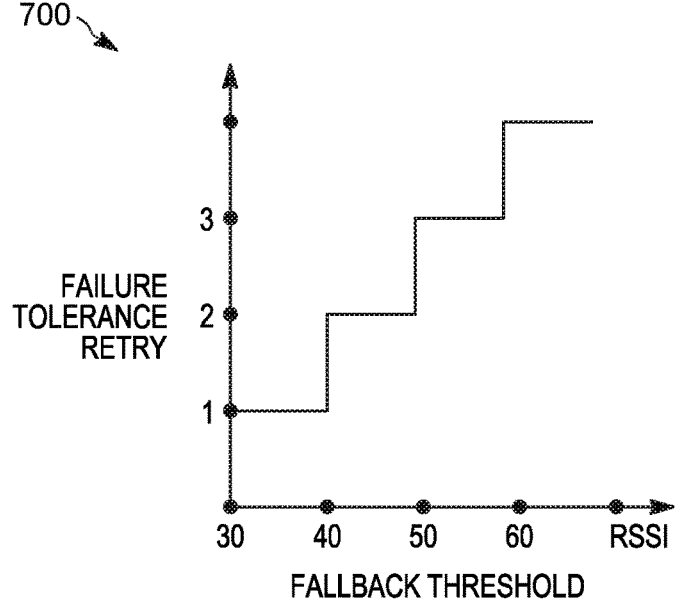
FIG. 5 is a chart illustrating a site lookback list generated with the system of FIG. 1 in accordance with some embodiments.
FIG. 6 is a chart illustrating fallback thresholds generated with the system of FIG. 1 in accordance with some embodiments.
FIG. 7 is a chart illustrating failure tolerance thresholds generated with the system of FIG. 1 in accordance with some embodiments.

As illustrated in the chart 600 of FIG. 6, the electronic processor 205 may use a fallback threshold for each site, which the electronic processor 205 may generate using the above equation and the last ten readings for each of the LMR sites.

Returning to FIG. 3, at block 308, the electronic processor 205 determines whether a current radio communication characteristic value associated with a home site of the converged communication device 102 (for example, the current RSSI reading for the home site) exceeds the fallback threshold.

When the current radio communication characteristic value does not exceed the fallback threshold (at block 310), LMR network conditions are such that the converged communication device 102 will not fall back to a broadband connection. The electronic processor 205 continues operating using the land mobile radio modality, at block 302.

When the current radio communication characteristic value exceed the fallback threshold (at block 310), LMR network conditions are such that the converged communication device 102 will fall back to a broadband connection to continue communicating. The electronic processor 205, at block 312, operates a second communication interface (for example, the second transceiver 227) of the converged communication device 102 to execute a second communication (for example, a voice communication) between the converged communication device 102 and the second network 106 using a non-land mobile radio modality (for example, an LTE™ protocol).

As noted, when the current RSSI value for the home site of the converged communication device 102 exceeds the fallback threshold for the home site, LMR network conditions are such that the converged communication device 102 will not fall back to a broadband connection. However, service failures may still occur. Service failures include an out of range error, a retry failure, a quick fading signal, and a bit error rate in excess of acceptable levels. In some embodiments, an LMR service failure will trigger the switch to the non-land mobile radio modality. However, in order to prevent rapid switching between networks, the response to service failures can be scaled. In some embodiments, the converged communication device 102 reacts faster to a service failure when it is operating closer to the fallback threshold, and is more tolerant to service failures when it is operating further from the fallback threshold. In some embodiments, in response to detecting the service failure, the electronic processor 205 determines whether a failure tolerance threshold has been exceeded.

The failure tolerance threshold is the number of service failures that will be tolerated prior to falling back to a broadband network connection. For example, FIG. 7 includes a graph 700, which illustrates the failure tolerance when the RSSI for LMR site 1 is above its fallback threshold. As illustrated in FIG. 7, when the RSSI is less than or equal to thirty, there is no failure tolerance (i.e., the failure tolerance is zero), which means the electronic processor 205 will fall back immediately. When the RSSI is between thirty and forty, the electronic processor 205 will fall back to broadband on the occurrence of one failure (i.e., the failure tolerance is one). When the RSSI is between forty and fifty, the electronic processor 205 will fall back to broadband on the occurrence of two failures, and so on. When the failure tolerance threshold has been exceeded, the electronic processor 205 will operate the converged communication device 102 using the broadband communication modality. In some embodiments, the failure tolerance threshold is adjusted based on historical RSSI data gathered in the region and past successes or failures.

Figure 4:
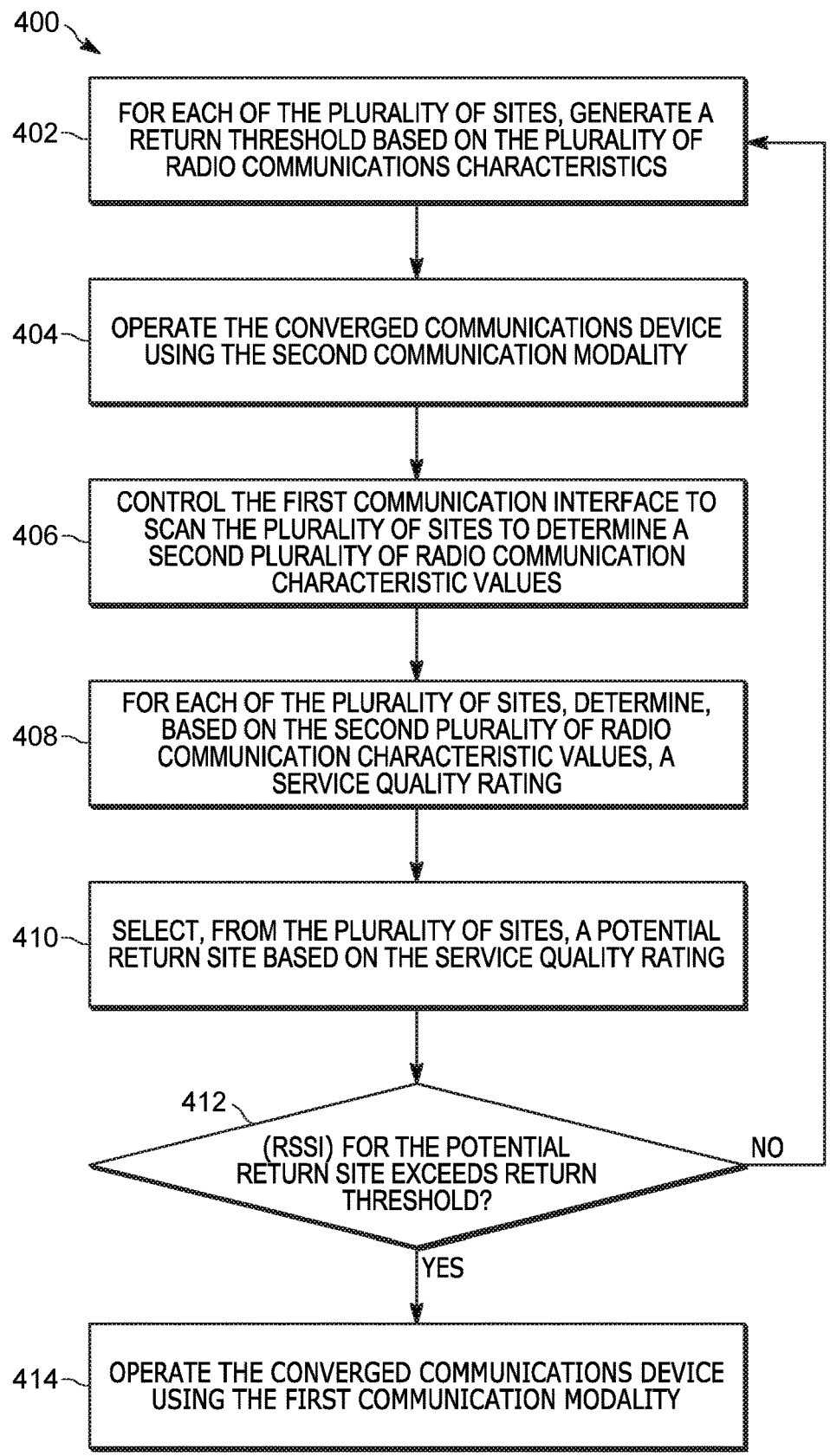
FIG. 4 is a flowchart illustrating a method for operating the converged communication device of FIG. 2 in accordance with some embodiments.

In some embodiments, operating on the broadband network is a backup mode for the converged communication device 102. In such embodiments, the default and preferred operating mode is LMR. Accordingly, while operating in broadband mode, the converged communication device 102 monitors LMR sites to determine when to return to the LMR network. FIG. 4 illustrates an example method 400 for operating a converged communication device using dynamic return thresholds. Although the method 400 is described in conjunction with the system 100 as described herein, the method 400 could be used with other systems and devices. In addition, the method 400 may be modified or performed differently than the specific example provided.

As an example, the method 400 is described as being performed by the converged communication device 102 and, in particular, the electronic processor 205. However, in some embodiments, all or portions of the method 400 may be performed by other devices. Additional electronic processors may also be included in the converged communication device 102 that perform all or a portion of the method 400. For ease of description, the method 400 is described in terms of the converged communication device 102, the first network 104, and the second network 106. However, the method 400 may be applied to hundreds or thousands of devices operating across multiple networks.

Figure 8:
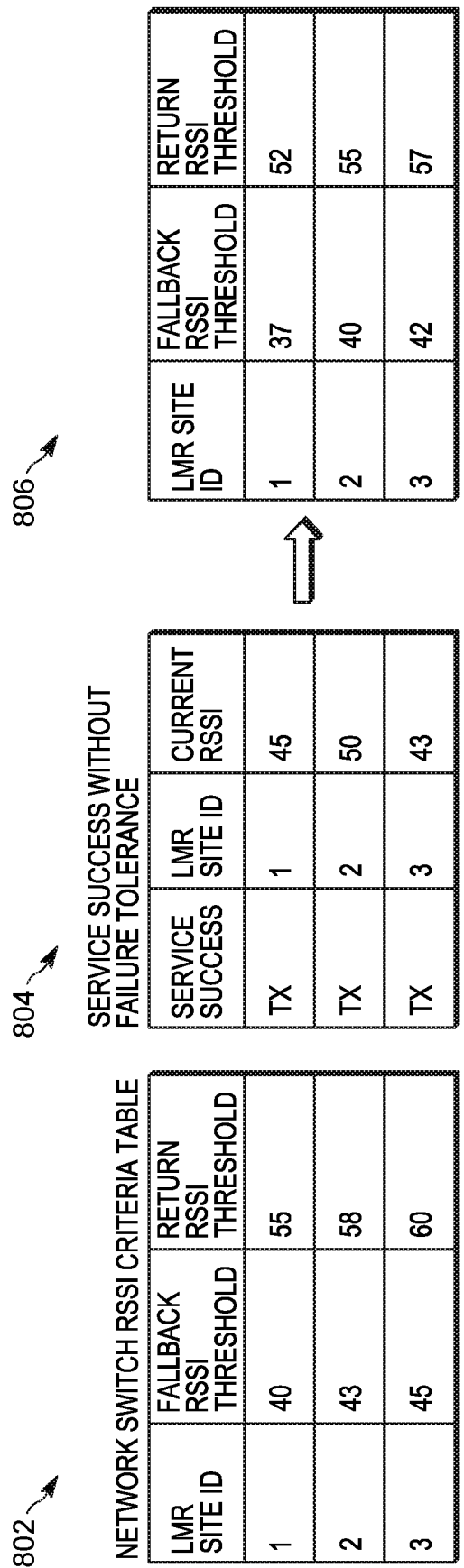
FIG. 8 includes charts illustrating aspects of the operation of the system of FIG. 1 in accordance with some embodiments.

At block 402, the electronic processor 205, for each of the plurality of sites, generates a return threshold based on the plurality of radio communications characteristics. In some embodiments, as explained in further detail below, the return threshold is an RSSI value that is used by the converged communication device 102 to determine when to move back to the LMR network from the broadband network, assuming that no service failures are known. In some embodiments, a hysteresis mechanism prevents the converged communication device 102 from frequently bouncing between the LMR and broadband networks. The electronic processor 205 generates a return threshold based on the fallback threshold and an RSSI hysteresis buffer. The hysteresis buffer can be a fixed value that has been determined to prevent the converged communication device 102 from switching frequently. In the example illustrated in chart 802 of FIG. 8, the hysteresis buffer is set to 15 RSSI points, such that, for each LMR site, the return RSSI threshold is equal to 15 RSSI points above the fallback threshold for that LMR site. In some embodiments, the return threshold can be periodically adjusted (increased or decreased) based on long term trends in service (failures or successes). For example, as illustrated in charts 804 and 806 of FIG. 8, the successful transmissions are used to adjust the fallback thresholds (and, thus, the return thresholds), downward. Similarly, transmission failures can result in adjusting the fallback thresholds (and, thus, the return thresholds), upwards.

Returning to FIG. 4, at block 404, the electronic processor 205 is operating the converged communication device using a second (backup) communication modality, such as a non-land mobile radio modality (e.g., a broadband network). For example, in some embodiments, the electronic processor 205 may be operating the converged communication device 102 using the non-land mobile radio modality (at block 404) as a result of executing the method 300, where the converged communication device 102 switches to the second communication modality at block 312.

At block 406, the electronic processor 205 controls the first communication interface (the first transceiver 225) to scan the plurality of sites 110, 112, 114 to determine a second plurality of radio communication characteristic values (for example, service success or failure indications for each of the sites). In some embodiments, the electronic processor 205 scans the LMR sites continuously. In some embodiments, the electronic processor 205 scans the LMR sites periodically.

At block 408, the electronic processor 205, for each of the plurality of sites, determines a service quality rating based on the second plurality of radio communication characteristic values. In some embodiments, the service quality rating is a measure of the success indications compared to the failure indications for a site (for example, a ratio). In some embodiments, the service quality rating includes a time component (for example, service failures per unit of time). In some embodiments, the service quality rating may be determined by applying weights to different types of service successes or failures (for example, based on the relative impact of the various service failures).

Regardless of how the service quality ratings are determined, at block 410, the electronic processor 205, selects, from the plurality of sites, a potential return site based on the service quality rating. For example, the electronic processor 205 selects the LMR site having the highest service quality rating.

When the RSSI level for the potential return site exceeds the return threshold for the site (at block 412), LMR network conditions are such that the electronic processor 205 returns from the broadband networks (second communication modality) and operates the converged communication device using the land mobile radio modality (the first communication modality), at block 414. In some embodiments, the electronic processor 205 operates the converged communication device 102 using the land mobile communication modality in response to determining that the RSSI level for the potential return site exceeds the return threshold and that a minimum stay timer has expired. The minimum stay timer is a minimum time that the converged communication device 102 will operate using the broadband network. This prevents the converged communication device from bouncing between two networks in the event that RSSI is rapidly fluctuating.

When the RSSI for the potential return site fails to exceed the return threshold (at block 412), the electronic processor 205 continues to operate the converged communication device 102 using the broadband modality (second communication modality), at block 402. As illustrated in FIG. 4, the electronic processor 205 will continue to evaluate the LMR network and update the dynamic thresholds while operating on the broadband network.

In some embodiments, the electronic processor 205 determines that an LMR site has recovered from a major failure (for example, a power failure) and is coming back online. For example, the electronic processor 205 may receive an electronic message indicated that a site is recovered. In that event, the electronic processor 205 may hold off returning to the LMR network (or to the recovered LMR site) for a period of time (for example, a random period). This prevents too many devices from reconnecting to the LMR site from the broadband network at the same time, which may result in degraded service or a site crash.

In some embodiments, as a result of proceeding to block 414, the electronic processor 205 returns to block 302 of the method 300 in FIG. 3. Accordingly, in some embodiments, the electronic processor 205 loops back and forth between the method 300 and the method 400. For example, in some embodiments, the electronic processor 205 executes the method 300 until the fallback threshold is no longer exceeded, then switches to execute the method 400 until the return threshold is exceeded, then returns to execute the method 300 until the fallback threshold is again exceeded, and so on, looping back and forth between the methods.

The methods 300 and 400 are described herein with the assumption that LMR is the default and preferred network for the converged communication device 102, and broadband is a backup network. However, it should be noted that the methods can apply to various communication modalities, and that in some embodiments, other network types may be used as the backup and default/preferred networks.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

It should also be understood that although certain examples depict components as logically separate, such depiction is merely for illustrative purposes. In some embodiments, the illustrated components may be combined or divided into separate software, firmware and/or hardware. Regardless of how they are combined or divided, these components may be executed on the same computing device or may be distributed among different computing devices connected by one or more networks or other suitable communication means.

In addition, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A converged communication device comprising:
   a first communication interface configured to communicate with a land mobile radio (LMR) network using a first communication modality, the first communication modality being a land mobile radio (LMR) modality;
   a second communication interface configured to communicate with a broadband network using a second communication modality, the second communication modality being a non-land mobile radio broadband modality; and
   an electronic processor coupled to the memory, the first communication interface, and the second communication interface, and configured to
     operate the converged communication device using the first communication modality to execute a first communication between the converged communication device and the land mobile radio (LMR) network,
     determine a plurality of radio communication characteristic values for each of a plurality of sites of the land mobile radio (LMR) network,
     generate a fallback threshold for a home site of the converged communication device based on the plurality of radio communications characteristics;
     for each of the plurality of sites, generate a return threshold based on the plurality of radio communications characteristics;
     determine whether a current radio communication characteristic value associated with a home site of the converged communication device exceeds the fallback threshold,
     when the current radio communication characteristic value does not exceed the fallback threshold, operate the converged communication device using the second communication modality to execute a second communication between the converged communication device and the broadband network;
   while operating the converged communication device using the second communication modality,
     control the first communication interface to scan the plurality of sites to determine a second plurality of radio communication characteristic values;
     for each of the plurality of sites, determine, based on the second plurality of radio communication characteristic values, a service quality rating;
     select, from the plurality of sites, a potential return site based on the service quality rating; and
     when the received signal strength intensity for the potential return site exceeds the return threshold for the potential return site, operate the converged communication device using the first communication modality.

2. The converged communication device of claim 1, wherein the electronic processor is configured to operate the converged communication device using the first communication modality when the received signal strength intensity for the potential return site exceeds the return threshold and a minimum stay timer has expired.

3. The converged communication device of claim 1, wherein the electronic processor is configured to generate a return threshold based on the fallback threshold and a received signal strength intensity hysteresis buffer.

4. The converged communication device of claim 1, further comprising:
   a memory;
   wherein the electronic processor coupled to the memory and configured to
     detect a service failure for the home site based on at least one radio communication characteristic value for the home site; and
     write, to the memory, the at least one radio communication characteristic value for the home site at the time of the service failure and a received signal strength intensity level for the home site at the time of the service failure.

5. The converged communication device of claim 4, wherein the electronic processor is configured to
   in response to detecting the service failure, determine whether a failure tolerance threshold has been exceeded; and
   when the failure tolerance threshold has been exceeded, operate the converged communication device using the second communication modality to execute a second communication between the converged communication device and the broadband network.

6. The converged communication device of claim 4, wherein the electronic processor is configured to detect a service failure for the home site based on at least one selected from the group consisting of an out of range error, a retry failure, and a bit error rate.

7. The converged communication device of claim 4, wherein the electronic processor is configured to
   retrieve from the memory the at least one radio communication characteristic value for the home site at the time of the service failure; and
   determine the fallback threshold based on the plurality of radio communications characteristics, the at least one radio communication characteristic value for the home site at the time of the service failure, and the received signal strength intensity level for the home site at the time of the service failure.

8. The converged communication device of claim 1, wherein the first communication is a push-to-talk communication.

9. The converged communication device of claim 1, wherein the electronic processor is configured to determine a plurality of radio communication characteristic values by determining at least one of a control channel frequency, a site identifier, a system accessibility, and an acceptable received signal strength intensity level.

10. A method for operating a converged communication device, the method comprising:
operating a first communication interface of the converged communication device to execute a first communication between the converged communication device and a land mobile radio (LMR) network using a land mobile radio (LMR) modality;
determining, with an electronic processor, a plurality of radio communication characteristic values for each of a plurality of sites of the land mobile radio (LMR) network;
generating a fallback threshold for a home site of the converged communication device based on the plurality of radio communications characteristics;
generating, for each of the plurality of sites, a return threshold based on the plurality of radio communications characteristics;
determining whether a current radio communication characteristic value associated with a home site of the converged communication device exceeds the fallback threshold;
when the current radio communication characteristic value does not exceed the fallback threshold, operating a second communication interface of the converged communication device to execute a second communication between the converged communication device and a second broadband network using a non-land mobile radio broadband modality;
while operating the converged communication device using the non-land mobile radio broadband modality, controlling, with the electronic processor, the first communication interface to scan the plurality of sites to determine a second plurality of radio communication characteristic values;
for each of the plurality of sites, determining, based on the second plurality of radio communication characteristic values, a service quality rating;
selecting, from the plurality of sites, a potential return site based on the service quality rating; and
when the received signal strength intensity for the potential return site exceeds the return threshold for the potential return site, operating the converged communication device using the land mobile radio (LMR) modality.

11. The method of claim 10, further comprising:
operating the converged communication device using the land mobile radio (LMR) modality when the received signal strength intensity for the potential return site exceeds the return threshold and a minimum stay timer has expired.

12. The method of claim 10, wherein generating a return threshold includes generating a return threshold based on the fallback threshold and a received signal strength intensity hysteresis buffer.

13. The method of claim 10, further comprising:
detecting, with the electronic processor, a service failure for the home site based on at least one radio communication characteristic value for the home site; and
writing, to a memory coupled to the electronic processor, the at least one radio communication characteristic value for the home site at the time of the service failure and a received signal strength intensity level for the home site at the time of the service failure.

14. The method of claim 13, further comprising:
in response to detecting the service failure, determining whether a failure tolerance threshold has been exceeded; and
when the failure tolerance threshold has been exceeded, operating a second communication interface of the converged communication device to execute a second communication between the converged communication device and a broadband network using a non-land mobile radio broadband modality.

15. The method of claim 13, wherein the electronic processor is configured to detect a service failure for the home site based on at least one selected from the group consisting of an out of range error, a retry failure, and a bit error rate.

16. The method of claim 13, further comprising:
retrieving from the memory the at least one radio communication characteristic value for the home site at the time of the service failure; and
determining the fallback threshold based on the plurality of radio communications characteristics, the at least one radio communication characteristic value for the home site at the time of the service failure, and the received signal strength intensity level for the home site at the time of the service failure.

17. The method of claim 10, wherein executing the first communication includes transmitting a push-to-talk communication.

18. The method of claim 10, wherein determining a plurality of radio communication characteristic values includes determining at least one of a control channel frequency, a site identifier, a system accessibility, and an acceptable received signal strength intensity level.

* * * * *